United States Patent
Kamikawa

(10) Patent No.: US 6,719,075 B2
(45) Date of Patent: Apr. 13, 2004

(54) FRAME STRUCTURE OF CRAWLER-TYPE CONSTRUCTION MACHINE VEHICLE

(75) Inventor: Shinobu Kamikawa, Komatsu (JP)

(73) Assignee: Komatsu Ltd., Tokyo (JP)

( * ) Notice: Subject to any disclaimer, the term of this patent is extended or adjusted under 35 U.S.C. 154(b) by 39 days.

(21) Appl. No.: 09/925,450

(22) Filed: Aug. 10, 2001

(65) Prior Publication Data

US 2002/0023786 A1 Feb. 28, 2002

(30) Foreign Application Priority Data

Aug. 15, 2000 (JP) .......................................... 2000-246429

(51) Int. Cl.[7] .............................................. B62D 55/00
(52) U.S. Cl. ....................................... 180/9.1; 280/797
(58) Field of Search ...................... 180/6.7, 9.1, 9.48, 180/311, 312; 280/781, 797

(56) References Cited

U.S. PATENT DOCUMENTS

| | | | | |
|---|---|---|---|---|
| 1,629,890 A | * | 5/1927 | Ronk | 280/799 |
| 2,144,760 A | * | 1/1939 | Harnischfeger | 180/9.1 |
| 3,529,687 A | * | 9/1970 | Pensa | 180/9.1 |
| 3,696,879 A | * | 10/1972 | Terai | 180/9.48 |
| 3,861,498 A | * | 1/1975 | Grove | 280/797 |
| 4,000,784 A | * | 1/1977 | Morrow, Sr. | 180/9.48 |
| 4,195,740 A | * | 4/1980 | Beduhn | 180/9.1 |
| 4,361,242 A | * | 11/1982 | Dion | 180/9.1 |
| 4,391,341 A | * | 7/1983 | Taghon | 180/9.1 |
| 4,650,017 A | * | 3/1987 | Pelletier | 180/9.1 |
| 5,894,908 A | | 4/1999 | Eftefield | 280/781 |
| 6,322,104 B1 | * | 11/2001 | Duppong | 280/781 |

FOREIGN PATENT DOCUMENTS

| | | |
|---|---|---|
| JP | 6-49284 | 7/1994 |
| JP | 6-51083 | 7/1994 |

* cited by examiner

Primary Examiner—Daniel G. DePumpo
(74) Attorney, Agent, or Firm—Varndell & Varndell, PLLC

(57) ABSTRACT

The invention is directed to providing a frame structure of a crawler type construction machine vehicle facilitating a degree of freedom of reforming in accordance with a variation of vehicle kind. The frame structure is capable of setting a vehicle body gravitational center position to an optimum portion by use of an upper vehicle frame at an arbitrary position that is capable of strengthening total rigidity by an integrated structure. The frame structure has left and right track frames, and front and rear cross beams for coupling the left and right track frames in a shape of a lattice. A vehicle body frame is disposed between inner sides of the left and right track frames and coupled thereto in the shape of a lattice above the front and rear cross beams and the left and right track frames. The front and rear cross beams and the vehicle body frames are integrally constituted.

10 Claims, 6 Drawing Sheets

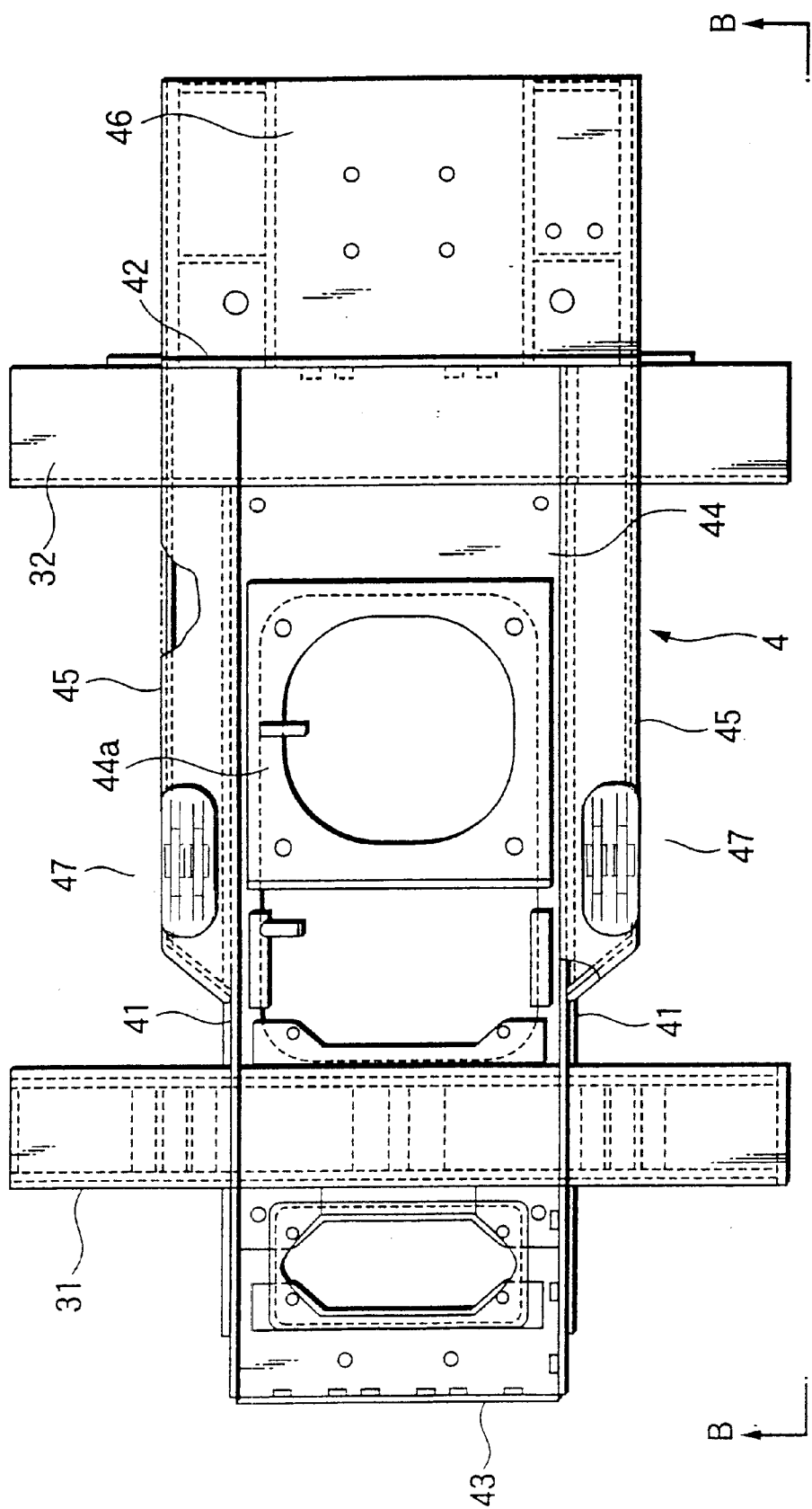

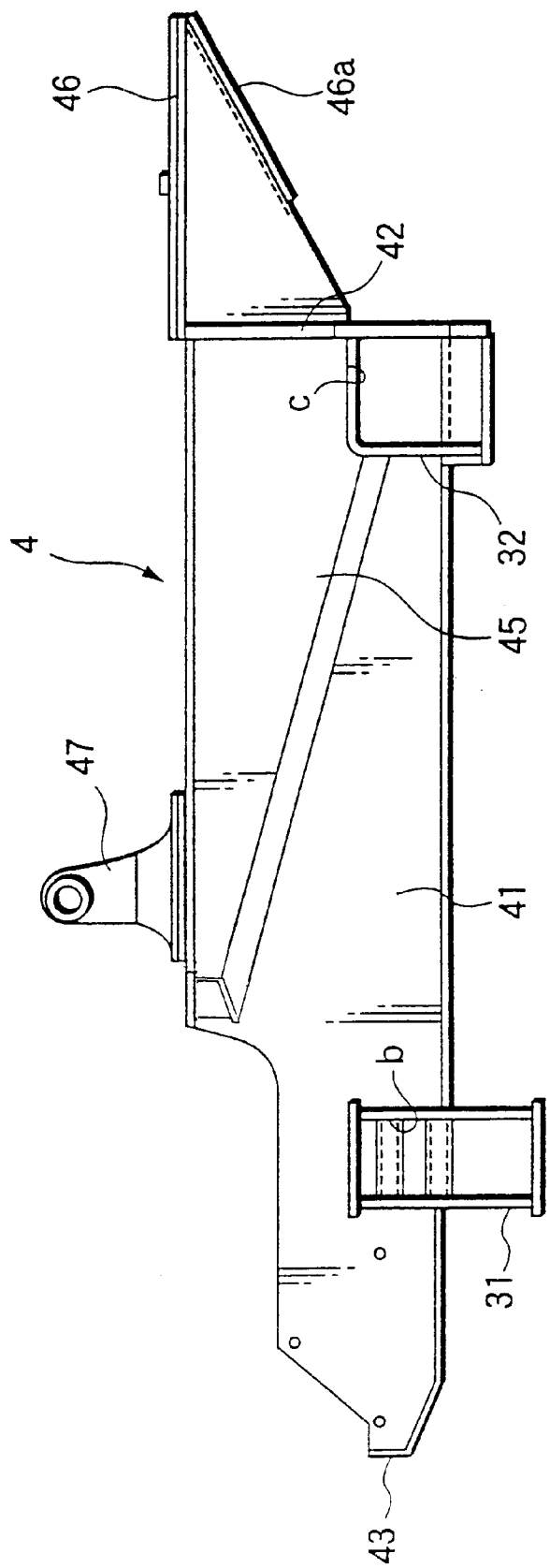

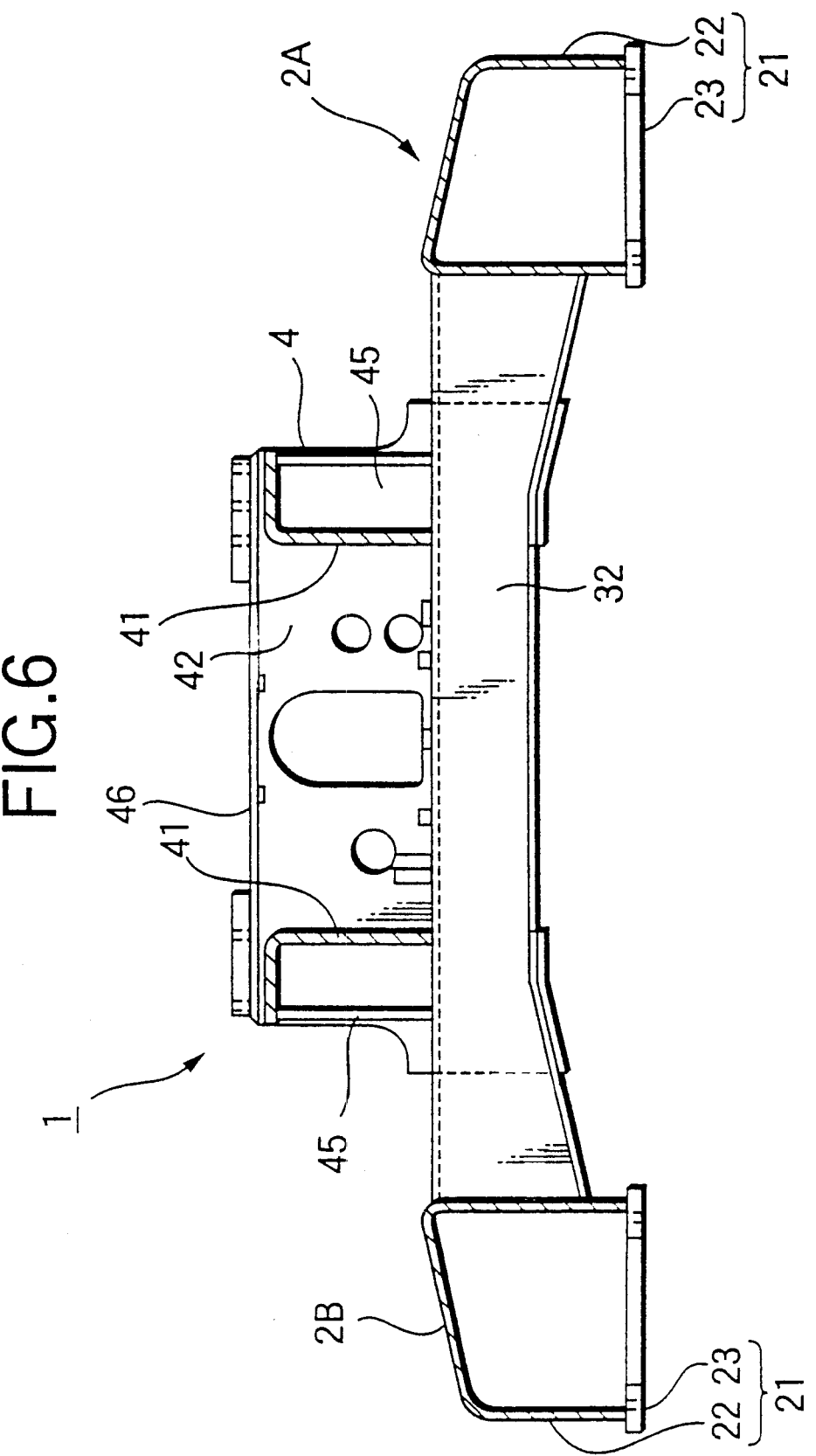

FRAME STRUCTURE OF CRAWLER-TYPE CONSTRUCTION MACHINE VEHICLE

TECHNICAL FIELD

The present invention mainly relates to a frame structure of a construction machine vehicle having a crawler travelling apparatus, and relates to a frame structure of a crawler-type construction machine vehicle capable of strengthening total rigidity and capable of setting a gravitational center position at an optimum location in accordance with a variation in vehicle kind while retaining a basic configuration.

BACKGROUND OF THE INVENTION

Conventionally, a construction machine vehicle having crawler travelling apparatus is constructed such that an engine and a mechanical power transmission apparatus are mounted on a vehicle frame, and crawler driving reduction gears are interposed between the vehicle frame on which the power transmission apparatus and track frames of the left and right crawler travelling apparatus to connect and integrate the vehicle frame and the track frames. According to the vehicle with such arrangement, a connecting and attaching position of the vehicle body frame and the track frames is restrained by a position of the crawler driving reduction gears to be uniquely determined thereby.

Therefore, in to the conventional construction machine vehicle, since the positions of connecting and attaching the vehicle body frame to the track frames cannot be selected, a problem is posed that the vehicle body balance must be carefully set in order to make the gravitational center of the vehicle body be at a proper position of the track frames.

Meanwhile, in recent times, it is necessary to fabricate vehicle kinds having various conditions by request of a user. Therefore, constitution and specification of vehicle body frame and the crawler travelling apparatus are requested to change in accordance with a variation of vehicle kind such as a crawler travelling apparatus having a long ground length and a crawler traveling apparatus widening an inter-crawler distance between left and right crawlers. However, there poses a problem that reforming of structure to meet the request is not easy and is in a large scale.

With regard to the problem, according to U.S. Pat. No. 5,894,908, there is proposed an integrated frame for strengthening total rigidity by completely integrating an upper vehicle frame and a lower track frames. However, according to the constitution, a crawler travelling apparatus in accordance with variation of the vehicle kind (for example, crawler travelling apparatus prolonging the ground length, crawler travelling apparatus widening intercrawler distance of left and right crawlers) cannot simply be reformed without changing the basic configuration. Further, the upper vehicle frame cannot be integrated to track frames by coupling these at a pertinently selected position while corresponding to the vehicle body gravitational center position.

Further, some studies have been disclosed, for example, with respect to a bulldozer, although in order to promote the rigidity of the frame structure of the vehicle body or achieving light-weighted formation, in, for example, Japanese Utility Model Laid-Open No. 51083/1994, and Japanese Utility Model Laid-Open No. 49284/1994, however, these constitutions only achieve rationalization by using members in a pipe-like shape for cross bars for coupling main frames and track frames and there poses a problem that in order to correspond to variation of vehicle kind, the structure must be totally reformed.

The invention has been carried out in view of the above-described problem and it is an object thereof to provide a frame structure of a crawler type construction machine vehicle which can be easily reformed in accordance with a variation of vehicle kind by simplifying a structure of integrating a track frame of a crawler travelling apparatus and an upper vehicle body frame, which can set a vehicle body gravitational position at an optimum location by enabling to install the upper vehicle body frame at an arbitrary position and capable of strengthening total rigidity by enabling to constitute an integrated structure.

DISCLOSURE OF THE INVENTION

In order to achieve the above-described object, according to the invention, there is provided a vehicle frame structure of a crawler type construction machine vehicle which integrates a pair of left and right track frames and vehicle body frames into a rigid structure:

wherein a pair of track frames installed in parallel with each other by providing an interval therebetween in a left and right direction, are integrally coupled by front and rear cross beams bridging the left and right track frames;

wherein a pair of left and right vehicle body frame members installed in parallel with each other and in parallel with the left and the right track frames within a width of the interval of the left and the right track frames are integrally coupled to bridge upper positions of the front and the rear cross beams; and wherein the pair of left and right track frames and the pair of left and right vehicle body frame members are integrally coupled by the front and the rear cross beams.

According to the invention, there is provided a lattice-like coupling structure for orthogonally coupling the front and rear cross beams to the pair of left and right track frames by a required arrangement and orthogonally coupling the vehicle body frame members to the front and rear cross beams at upper positions thereof. In this way, the left and the right track frames, the front and rear cross beams and the vehicle body frame members are each constituted as skeleton frames respectively independent from each other and therefore, there is achieved a degree of freedom of design. Therefore, the change of the variation of the vehicle body, for example, reattaching a crawler travelling apparatus having a long ground length prolonging the track frames or a vehicle widening an intercrawler distance of the left and right crawler travelling apparatus by prolonging lengths in the left and right direction of the front and rear cross beams, can be carried out only by changing independent essential portion members and there is achieved an effect that the design change is facilitated. Further, by pertinently adjusting and setting position of coupling the track frames and the vehicle body frame members relative to the front and rear cross members, an optimum gravitational position of the vehicle body in accordance with a changed product can arbitrarily be selected and there is achieved an effect of providing a rational vehicle body structure. It is noted that crawler driving reduction gears use hydraulic driving reduction gears built with hydraulic motors attached to the track frames and therefore, the positional relationship between the vehicle body frame and the track frames is not restrained as in using a conventional mechanical driving reduction gears and therefore, the object can be achieved.

According to the invention, it is preferable that the pair of left and right vehicle body frame members include long vertical plate beams, notched portions are provided at two locations in a longitudinal direction of lower sides of the vertical plate beams, the respective notched portions in the shape of the reverse recess are fitted to the front and the rear cross beams and the vertical plate beams are integrally coupled to the front and the rear cross beams in an intersected shape. By constituting this way, the vehicle body frame members are brought in mesh with the front and rear cross beams at the notched portions in the shape of the reverse recess to thereby constitute the lattice like coupling and therefore, a resistance against strain in a face in the horizontal direction of the front and rear cross beams and the track frame, is promoted and the total rigidity can be ensured.

Here, it is preferable that an interval between lower ends of the pair of left and right vertical plate beams is connected by a bottom plate member and an interval between rear ends thereof is connected by a vertical wall member directed vertically covering from upper faces of the rear ends of the left and the right vertical plate beams over to rear faces of the rear side cross beam.

Further, it is preferable that portions of the pair of left and right vehicle body frame members extending between the front side cross beam and the rear side cross beam are constituted to be box beam portions. When such a constitution is adopted, the left and right track frames are coupled by the box beam portions arranged at front and rear thereof to thereby constitute the lattice-like coupling structure and therefore, rigidity in the vertical direction is promoted and the structure can sufficiently stand load from the lift cylinders for an earth-moving machine.

Further, it is preferable that attaching brackets of lift cylinders for the earth-moving implement are provided at upper faces of front portions of the box beam portions and a sectional area of the box beam portion is gradually increased from a position of the attaching bracket of the lift cylinder for the earth-moving implement to the vertical wall member. By constituting in this way, operating force applied to the attaching brackets of the lift cylinders for the earth-moving implement can be distributed toward the rear side cross beam and light-weighted formation can be achieved by simplifying structure of portion other than necessary.

Further, it is preferable that the vertical wall member in right angle is attached with a frame base constituting an upper face thereof by a platform and constituting a lower face thereof by a support portion of the attachment. By constituting in this way, operating reaction force from the attachment is distributed to the vehicle body frames and to the rear cross beam and accordingly, operation of absorbing vibration is high and there is achieved an effect of capable of alleviating propagation of vibration to the vehicle body frame.

According to the invention, it is preferable that the left and the right track frames each includes, in a longitudinal direction, a bifurcated idler support frame portion at a front portion thereof, a frame portion having a section in a box-like shape with a roller attaching face at a middle portion thereof and a frame portion for attaching crawler driving reduction gears built with hydraulic motors offset to an inner side of the vehicle body from the middle portion at a rear portion thereof;

wherein the frame portions for attaching the crawler driving reduction gears built with the hydraulic motors are matched to rear face sides of two end portions of the rear cross beam and inner side faces of the frame portions having the section in the box-like shape are matched to the front and the rear cross beams and two end faces of the rear cross beam to thereby integrally couple with each other. By constituting in this way, the track frames are constituted by the integrated structure and therefore, positions of attaching the driving reduction gears built with the hydraulic motors related to drive and guide of the crawlers and positions of attaching roller attaching portions can be machined with excellent dimensional accuracy and even when the portions are fixedly attached integrally to the front and rear cross beams, there is no change in accuracies of the attaching positions and therefore, the crawlers are rotated smoothly. Further, the offset attaching frames of the hydraulic driving reduction gears are fixedly attached to the rear face of the rear cross beam and therefore, there is achieved an effect of sufficiently maintaining rigidity in view of strength.

BRIEF DESCRIPTION OF THE DRAWINGS

FIG. 4 is a plane view in a state in which vehicle body frames and front and rear cross members are integrated.

FIG. 5 is a view viewing FIG. 4 from B—B.

FIG. 6 is a sectional view taken along a line C—C of FIG. 1.

BEST MODE FOR CARRYING OUT THE INVENTION

An explanation will be given of specific embodiments of a frame structure of a crawler-type construction machine vehicle according to the invention in reference to the drawings as follows. It is noted that the embodiments will be described with respect to a frame structures of a bulldozer.

Figure 1:
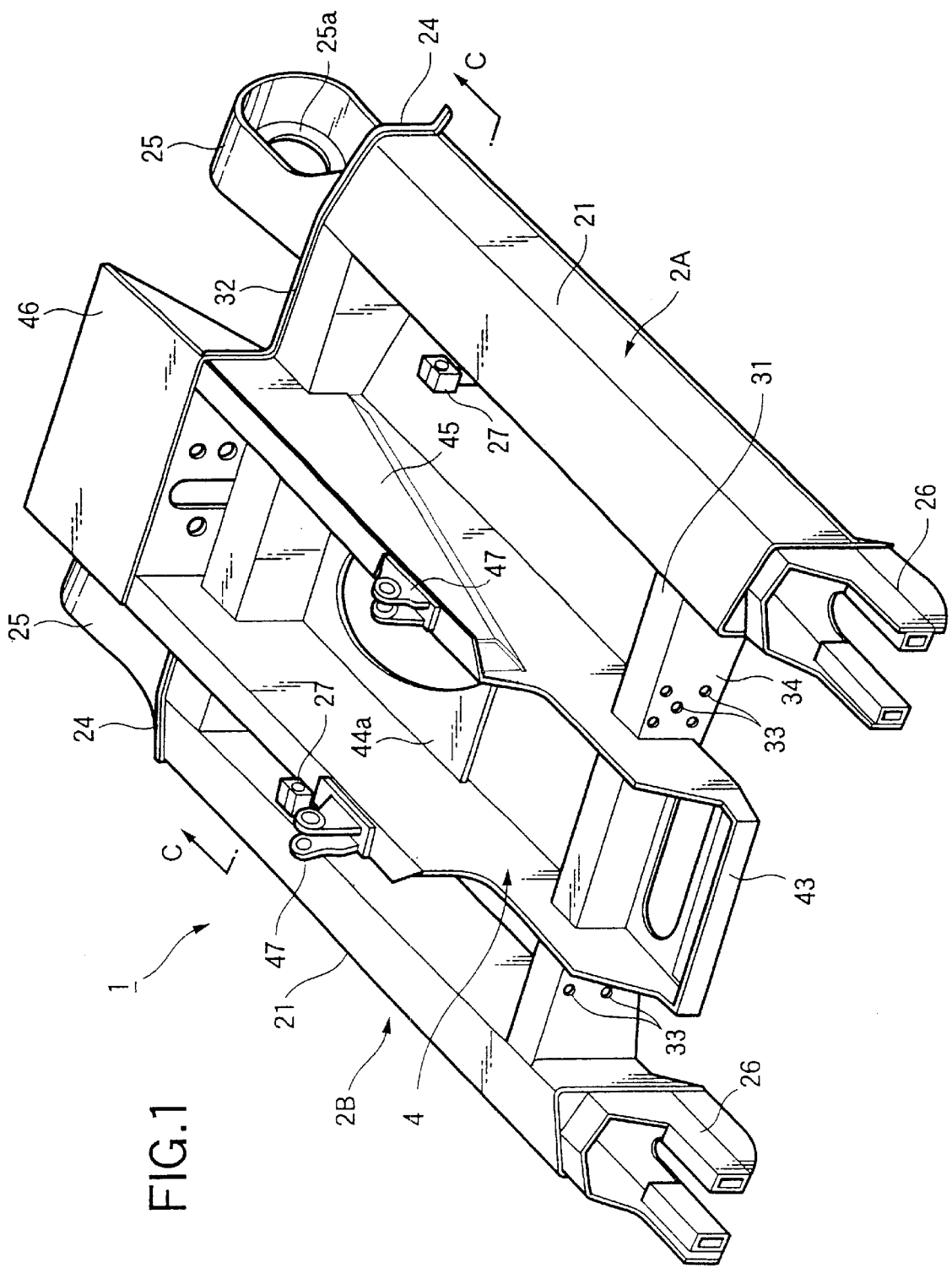
FIG. 1 is a perspective view of a total of a vehicle frame of a construction machine vehicle according to an embodiment.
Figure 2A:
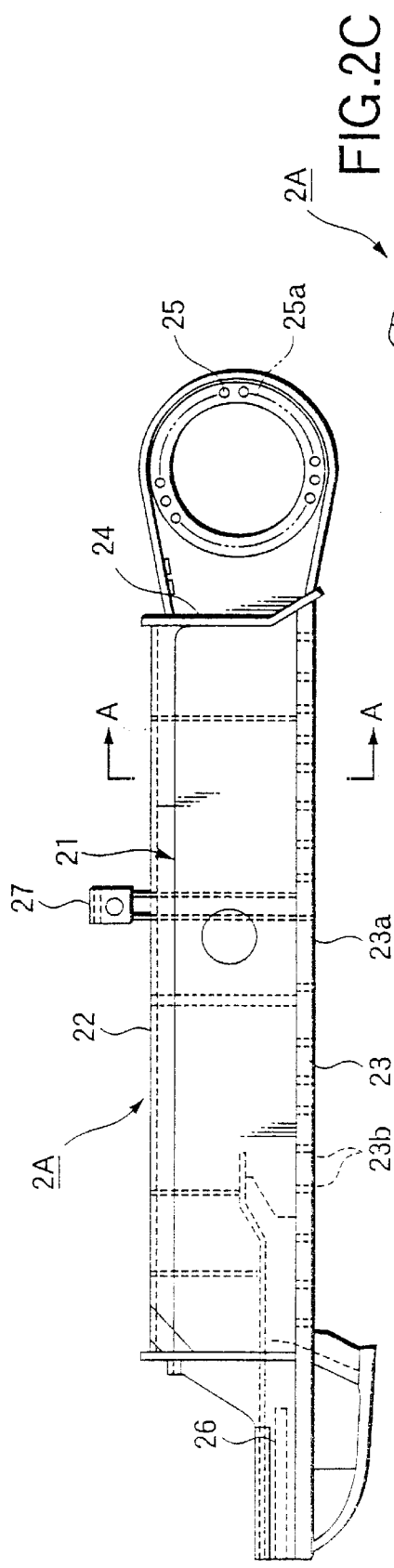
FIG. 2A is a side view.
Figure 2C:
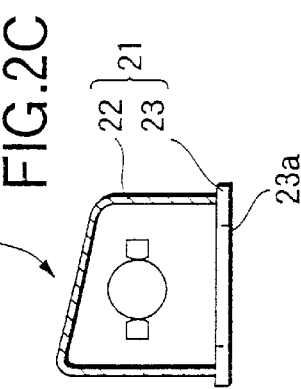
FIG. 2B is a plane view and FIG. 2C is a sectional view taken along a line A—A, illustrating a track frame.
Figure 2B:
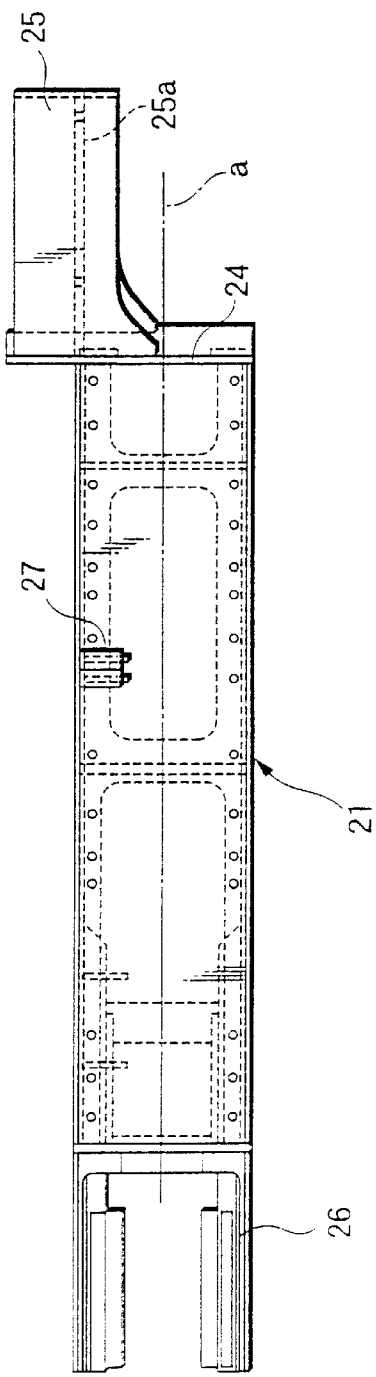
Figure 3:
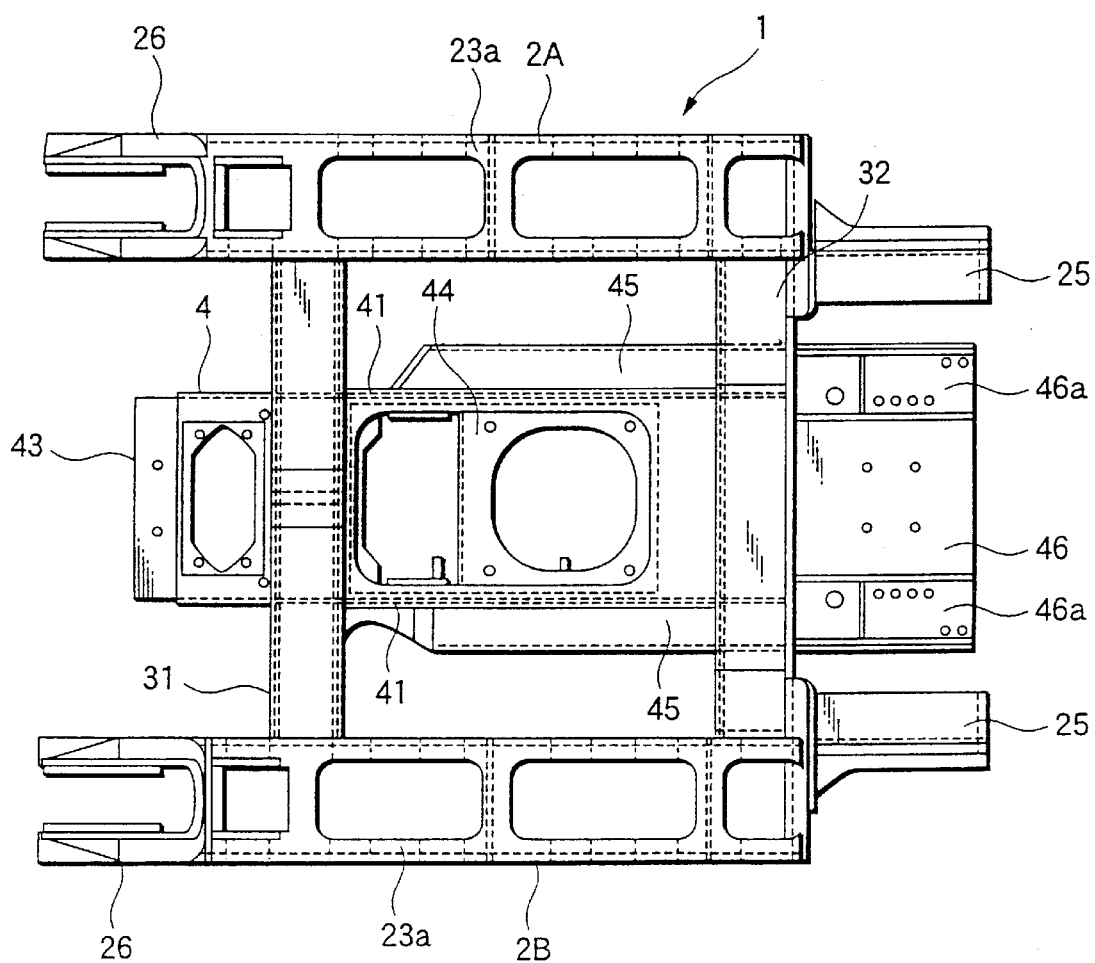
FIG. 3 is a bottom view of a vehicle frame.

FIG. 1 is a perspective view of a total vehicle frame of a crawler-type construction machine vehicle according to an embodiment of the invention and FIG. 2A is a front view, FIG. 2B is a plane view and FIG. 2C is a sectional view taken along a line A—A of FIG. 2B, showing a track frame, respectively. FIG. 3 is a bottom view of the vehicle frame, FIG. 4 is a plane view in a state in which vehicle body frames and front and rear cross members are combined, FIG. 5 is a view seen from B—B of FIG. 4, and FIG. 6 is a sectional view taken along a line C—C of FIG. 1, respectively.

A bulldozer according to the embodiment is mounted with crawler driving reduction gears of a hydraulic motor built-in type. A vehicle frame 1 is constructed by a constitution that integrally couples a vehicle body frame 4 to a pair of left and right track frames 2A and 2B for supporting crawler travelling apparatus. Front and rear cross members 31 and 32 couple the track frames 2A and 2B in a shape of a lattice, and a pair of left and right frame members 41 riding over the front and the rear cross members 31 and 32 are arranged in a width of an interval between the left and right track frames 2A and 2B in parallel with the left and right track frames.

The track frames 2A and 2B are basically constituted in left and right symmetry and shapes of portions thereof differ only in details thereof. Therefore, for convenience of explanation, an explanation will be given of the track frame 2A on the right side. As shown by FIGS. 2A, 2B and 2C, the track frame 2A is constituted by integrally welding a main frame 21 formed in a shape of a long box by welding a main member 22 formed in a required length by bending a steel plate in a shape of a trough by a necessary width dimension to a support member 23 having a plurality of long square through holes at a bottom face side thereof by directing an opening side thereof downwardly, a driver frame 25 having a reduction gear attaching portion coupled to a support end plate 24 welded to be attached to a rear end of the main frame 21 while being offset to one side (inner side in integration) from a plane axis center line and an idler support frame 26 formed in a bifurcated shape and attached to a front end of the main frame 21. Further, as shown by FIG. 2C, an upper face of the main member 22 is formed in an inclined face having a down slope toward an outer side (outer side in integration).

A downward face 23a of the support member 23, which is constituted by a slightly thick plate and attached as the bottom face of the main plate 21, is perforated with a plurality of attaching holes 23b with a predetermined space one another and bearings (not illustrated) for supporting rollers are arranged by the attaching holes 23b. Further, at a pertinent position at middle in the longitudinal direction on an inner side of an upper face of the frame portion 21, there is provided at least one (one in the specific example) of an upper roller support bracket 27 which stands straight.

Other is formed symmetrically with the track frame 2A on the right side. Further, the shape of the upper face of the main member 22 in the main frame 21 is not limited to the above-described shape but can be formed in any outer shape necessary for constituting the vehicle.

The cross beams 31 and 32 are constituted respectively having necessary dimensions by steel plate members having necessary thicknesses in a box like structure, and both ends thereof are adapted to be orthogonally welded and coupled to side faces of the track frames 2A and 2B. Further, in integrating, a front side face of the front side cross member 31 is provided with attaching seat portions for fixedly connecting base end portions of a working implement frame (not illustrated) each seat portion being spaced apart from the central position by necessary dimensions in left and right direction, and is provided with a plurality of attaching bolt holes 33 for connecting the working implement frame in the front and rear direction.

The vehicle body frame 4 is provided with the pair of left and right vehicle body frame members 41 having a necessary length dimension, and is constituted by integrally coupling rear ends thereof by a rear support plate (vertical wall member) 42, coupling front ends thereof by a front connecting member 43 and coupling bottom portions thereof by a bottom plate member 44. The left and right vehicle body frame members 41 can include vertical plate beams. Further, the vehicle body frame 4 is provided with a box structure portion (box beam portion) 45 formed on an outer side such that a dimension in an up and down direction is gradually widened from a middle portion of the vertical plate beams 41 (the left and right vehicle body frame members) to a rear end thereof and in an integrated state, the box structure portion 45 is connected to the rear side cross beam 32.

The rear support plate 42 is installed with a notched hole and a plurality of through holes at a central portion thereof. Further, a rear face of the rear support plate 42 is integrally coupled with an attachment attaching bracket (frame base) 46, an upper face of which constitutes a platform of a vehicle body mounted object and a lower face of which constitutes attachment supporting portions 46a. An upper face of the bottom plate 44 is formed with an apparatus attaching seat 44a. Further, brackets 47 for attaching lift cylinders for an earth-moving implement are attached to positions of front end portions of upper faces at portions of the vertical plate beams 41 formed with the box structure portions 45 respectively by welding.

The left and right track frames 2A and 2B, the front and rear cross beams 31 and 32 and the vehicle body frame 4 constituted in this way, are fabricated to be units respectively and assembled by welding in predetermined dimensions to thereby constitute the vehicle frame 1.

Explaining a mode of the combination, the vehicle body frame 4 firstly welded and coupled in predetermined dimensions, is fabricated by a constitution in which based on the basic dimensions, the pair of left and right vertical plate beams 41 are provided with notched portions (notched portions in a shape of a reverse recess) b and c capable of fitting to the cross members 31 and 32 in compliance with an interval of arranging the front and rear cross members 31 and 32. Further, outer side portions of the vertical plate beams 41 are formed with the box structure portions 45. The left and right vertical plate beams 41 are arranged in parallel with each other by a predetermined interval and coupled, and front and rear portions thereof are connected, by the front connection member 43 and the rear support plate 42, respectively, to thereby constitute an integrated frame structure. Further, the bottom plate 44 is welded to bottom portions of the two vertical plate beams 41, and the rear support plate 42 is coupled with the attachment attaching bracket 46 to thereby form the vehicle body frame 4.

Meanwhile, the front and rear side cross members 31 and 32 are fabricated by welding to constitute the box-like shaped beams with a required length dimension in correspondence with a previously set intercrawler distance of a crawler travelling apparatus by adjusting end portions thereof such that the two end portions can be orthogonally coupled to side faces of the track frames 2A and 2B. Further, the front side cross member 31 is provided with attaching seat portions 34 and the attaching bolt holes 33 capable of fastening the base portion of the working implement frame to the front side face as described above.

The front and rear cross members 31 and 32 constituted in this way, are respectively fitted to the notched portions b and c formed at the vertical plate beams 41 of the vehicle body frame 4 and welded, and integrated in a shape of a lattice as shown in FIG. 4. Further, the attachment attaching bracket 46 is attached before or after assembling in accordance with a procedure of operation. By constituting in this way, there can be constituted a frame structure having high rigidity by using the vertical plate beams having a simple sectional structure. Further, the box structure portions 45 formed on the outer side portions of the left and right vertical plate beams 41, are formed in a shape gradually widening from lower sides of positions of the brackets 47 for attaching the lift cylinders of the working implement fixedly erected at the upper faces to positions of coupling the rear side cross member 32 by down slope and therefore, load by the lift cylinders of the working implement operated to the attaching base portions of the brackets 47 for attaching the lift cylinders, is dispersed in the operating direction, and internal stresses are prevented from causing locally, thereby, the box structure portions 45 can rationally be constituted without being excessive strength members.

Further, according to the left and right track frames 2A and 2B, the driver frames 25 and the idler attaching frames 26 and, are coupled to front and rear ends of the main frames 21 constituted into the box-shape structure by welding and coupling the main members 22 subjected to plate bending as described above and the support members 23 for forming the bottom portions and the left and right track frames 2A and 2B are integrally constituted in necessary dimensions at details in correspondence with the two left and right track frames 2A and 2B. According to the track frames 2A and 2B constituted in this way, by butting, welding and coupling respective end faces of the vehicle body frame 4 constituted in the lattice shape by the cross members 31 and 32 and the cross members 31 and 32 to side faces thereof, the track frames 2A and 2B are arranged in parallel with each other at a predetermined intercrawler distance and the vehicle body frame 4 is integrated via the cross members 31 within the interval of the track frames 2A and 2B to upper sides thereof to thereby enable to constitute the vehicle body frame 1 having very high rigidity, the total of which is in the lattice shape and integrally constructed.

The vehicle frame 1 according to the invention constituted in this way is easy to correspond to a variation of vehicle kind such as a vehicle kind requiring a crawler travelling apparatus having a long ground length or a vehicle kind having a crawler travelling apparatus widening the intercrawler distance between the left and right crawlers since, as described above, constitutions of unitized structures linearly forming respective principal members, are combined and coupled in the lattice shape.

That is, compared with the vehicle body frame which is not basically changed so much, in the case of a vehicle kind requiring a crawler travelling apparatus having, a long ground length, for example, when the frame portions 21 of the track frames 2A and 2B are constituted in necessary lengths and the front and rear positions of the front and rear cross members 31 and 32 for coupling the vehicle body frame 4 and the two track frames 2A and 2B, are changed to positions in conformity with the vehicle kind, by providing the notched portions b and c for coupling with the front and rear cross members 31 and 32 relative to the vertical plate beams 41 constituting the vehicle body frame 4 to set positions thereof to necessary portions, the integrated frame can be constituted by selecting the vehicle body gravitational center position at an optimum position.

Further, in the case of the vehicle kind having a crawler travelling apparatus widening the intercrawler distance between the left and right crawlers, the constitution can be constructed by coupling side face portions of the front and rear cross members 31 and 32 for connecting and coupling the left and the right track frames 2A and 2B to each other and therefore, the object can be achieved by using the front and rear cross members 31 and 32 the length dimensions of which are changed to necessary lengths. Further, according to the vehicle frame 1 of the embodiment, the crawler travelling apparatus can be driven by mounting a reduction gear drive machine built with a hydraulic motor (not illustrated) to the driver frame 25 and therefore, by mounting a hydraulic unit (not illustrated) to an essential portion of the vehicle body frame 4, for example, the bottom plate 44 and connecting the hydraulic unit to the hydraulic motor by a hydraulic hose via a through hole provided at the rear support plate 42, the drive machine can be driven and therefore, the frame member can arbitrarily be changed in accordance with the variation of the vehicle kind.

In this way, there is constructed a new constitution which is not present in the conventional machine and in which the degree of freedom of changing combinations of the respective members is high and with regard to the coupling constitution as a whole, by always changing essential members similarly to optimum dimensions, the position of the gravitational center of the vehicle body in accordance therewith can arbitrarily be selected, further, in the coupling, by integrating the members in the shape of the lattice as described above, there is achieved an effect of capable of promoting the rigidity by integrating the total without constituting excessive members.

Further, according to the invention, the respective portions (track frames, front and rear cross members and vertical plate beams for forming the vehicle body frame) can be fabricated by unitizing the respective portions and accordingly, there is provided an advantage that can be rationalized fabricating the respective portions. Naturally, the members of the respective portions can be light-weighted by selecting optimum dimensions and in accordance therewith, there is achieved an effect of serving to reduce production cost and reduce energy consumption in driving as the vehicle by reducing total weight.

Although the invention the above-described explanation has been described with the vehicle frame of the bulldozer, the invention can be adopted in other crawler type construction machine vehicle other than the bulldozer.

What is claimed is:

1. A bulldozer having a frame structure, the frame structure including left and right track frames and a vehicle body frame that are integrally formed into a rigid structure;

the left and right track frames being parallelly arranged relative to each other and extending in a longitudinal direction of the frame structure, the left and right track frames respectively including a hollow structure extending in the longitudinal direction, the hollow structure being formed by vertically extending side walls joined together by a top wall, the left and right track frames being rigidly joined together by front and rear cross beams joined to one of the side walls of the left and right track frames; and the vehicle body frame including left and right vehicle body frame members parallelly arranged to the left and the right track frames between the left and the right track frames, the front and the rear cross beams passing through the left and right vehicle body frame members, and the left and right vehicle body frame members being rigidly joined to upper positions of the front and the rear cross beams.

2. The bulldozer frame structure according claim 1, wherein the left and right vehicle body frame members include long vertical plate beams, notched portions are provided at two locations in a longitudinal direction of lower sides of the vertical plate beams, the respective notched portions are fitted to the front and the rear cross beams and the vertical plate beams are integrally coupled to the front and the rear cross beams in an intersected shape.

3. The bulldozer frame structure according to claim 2, wherein an interval between lower ends of the left and right vertical plate beams is connected by a bottom plate member, and an interval between rear ends of the left and right vertical plate beams is connected by a vertical wall member at a right angle, the vertical wall member covering from upper faces of the rear ends of the left and the right vertical plate beams over to rear faces of the rear side cross beam.

4. The bulldozer frame structure according to claim 3, wherein the vertical wall member is provided with a frame base that extends rearward from and across the left and right vehicle body frame members forming a platform, and a lower portion of the frame base provides a support for an attachment.

5. The bulldozer frame structure according to claim 1, wherein the left and the right track frames respectively include, in a longitudinal direction, a bifurcated idler support frame portion at a front portion thereof, a frame portion having a section in a box shape having a roller attaching face arranged at a middle portion of the left and right track frames and a frame portion for attaching crawler driving reduction gears built with hydraulic motors offset to an inner side of the vehicle body from the middle portion at a rear portion of the left and right track frames; and wherein the frame portions for attaching the crawler driving reduction gears built with the hydraulic motors are matched to rear face sides of two end portions of the rear cross beam and inner side faces of the frame portions having the section in the box shape are matched to two end faces of the rear cross beam to thereby integrally couple with each other.

6. The bulldozer frame structure according to claim 1, wherein the front and rear cross beams and the left and right track frames being arranged in a common plane.

7. The bulldozer frame structure according to claim 1, wherein the left and right vehicle body frame members extending in front of the front cross beam.

8. The bulldozer frame structure according to claim 1, further including an attachment bracket secured to the left and right vehicle body frame members and extending in back of the rear cross beam.

9. The frame structure of a crawler construction machine vehicle which integrates left and right track frames and a vehicle body frame into a rigid structure, which comprises:

the left and right track frames being parallelly arranged in a left and right direction with an interval therebetween and integrally coupled together by front and rear cross beams respectively bridging the interval between the left and right track frames, the vehicle body frame including left and right vehicle body frame members parallelly arranged to the left and the right track frames within a width of the interval of the left and the right track frames, the left and right vehicle body frame members including long vertical plate beams, notched portions are provided at two locations in a longitudinal direction of lower sides of the vertical plate beams, the respective notched portions are fitted to the front and the rear cross beams so that the vertical plate beams are integrally coupled to the front and the rear cross beams in an intersected shape, and portions of the left and right vehicle body frame members extending between the front side cross beam and the rear side cross beam are constituted as box beam portions; and a bottom plate member connecting an interval between lower ends of the pair of left and right vertical plate beams, and an interval between rear ends of the left and right vertical plate beams being connected by a vertical wall member in a right angle, said vertical wall member covering from upper faces of the rear ends of the left and the right vertical plate beams over to rear faces of the rear side cross beam and the left and right vehicle body frame members being rigidly joined to upper positions of the front and the rear cross beams.

10. The frame structure of a crawler type construction machine vehicle according to claim 9, wherein attaching brackets of lift cylinders for an earth-moving implement are provided at upper faces of front portions of the box beam portions and a sectional area of the box beam portion is gradually increased from a position of the attaching bracket of the lift cylinder for the earth-moving implement to the vertical wall member.

* * * * *